United States Patent
Peter et al.

(10) Patent No.: US 11,263,666 B2
(45) Date of Patent: Mar. 1, 2022

(54) SYSTEM AND METHODS FOR A MICRO-ENGAGEMENT PLATFORM

(71) Applicant: Ushur, Inc., Santa Clara, CA (US)

(72) Inventors: Henry Thomas Peter, Mountain House, CA (US); Simha Sadasiva, San Jose, CA (US)

(73) Assignee: Ushur, Inc., Santa Clara, CA (US)

( * ) Notice: Subject to any disclaimer, the term of this patent is extended or adjusted under 35 U.S.C. 154(b) by 548 days.

(21) Appl. No.: 15/439,843

(22) Filed: Feb. 22, 2017

(65) Prior Publication Data
US 2017/0193557 A1   Jul. 6, 2017

Related U.S. Application Data

(63) Continuation-in-part of application No. 14/612,256, filed on Feb. 2, 2015, now Pat. No. 10,043,204, and (Continued)

(51) Int. Cl.
*G06Q 30/00* (2012.01)
*G06Q 30/02* (2012.01)
(Continued)

(52) U.S. Cl.
CPC ......... *G06Q 30/0267* (2013.01); *G06F 16/00* (2019.01); *G06F 16/9558* (2019.01);
(Continued)

(58) Field of Classification Search
CPC ............... G06Q 30/0267; G06Q 50/01; G06Q 30/0203; H04W 4/60; H04W 4/14;
(Continued)

(56) References Cited

U.S. PATENT DOCUMENTS 6,085,242 A   4/2000  Chandra
6,898,631 B1  5/2005  Kraft et al.
(Continued)

OTHER PUBLICATIONS

Kietzmann JH, Hermkens K, McCarthy IP, Silvestre BS. Social media? Get serious! Understanding the functional building blocks of social media. Business Horizons 2011 ;54(3):241-251. (Year: 2011).*

*Primary Examiner* — Anand Loharikar
(74) *Attorney, Agent, or Firm* — Lowenstein Sandler LLP; Madhumita Datta

(57) ABSTRACT

A micro-engagement platform system and method for creating and launching micro-engagements is disclosed. The platform enables creation of a set of one or more micro-engagements, which are short snippets of information exchanged as part of an overall goal of customer engagement; couples micro-engagements to intended customers on their mobile device via messaging; collects responses that a customer sends immediately or at a later point in time; initiates the next micro-engagement in the sequence after getting a response from the customer to the previous micro-engagement as part of the overall goal. The platform chooses from one of a plurality of modes of delivery for that snippet of information; modes can be SMS, mobile browser or ore or more mobile apps.

17 Claims, 15 Drawing Sheets

Related U.S. Application Data a continuation-in-part of application No. 14/607,034, filed on Jan. 27, 2015, now Pat. No. 10,713,698.

(60) Provisional application No. 62/298,342, filed on Feb. 22, 2016, provisional application No. 61/934,797, filed on Feb. 2, 2014, provisional application No. 61/932,170, filed on Jan. 27, 2014.

(51) Int. Cl.

| | |
|---|---|
| *H04W 4/60* | (2018.01) |
| *G06Q 50/00* | (2012.01) |
| *H04L 67/02* | (2022.01) |
| *H04L 51/046* | (2022.01) |
| *G06F 16/00* | (2019.01) |
| *H04L 12/46* | (2006.01) |
| *G06F 16/955* | (2019.01) |
| *H04L 67/55* | (2022.01) |
| *H04W 4/14* | (2009.01) |
| *H04L 51/52* | (2022.01) |

(52) U.S. Cl.
CPC ..... *G06F 16/9566* (2019.01); *G06Q 30/0203* (2013.01); *G06Q 50/01* (2013.01); *H04L 12/4625* (2013.01); *H04L 51/046* (2013.01); *H04L 67/02* (2013.01); *H04W 4/60* (2018.02); *H04L 51/32* (2013.01); *H04L 67/26* (2013.01); *H04W 4/14* (2013.01)

(58) Field of Classification Search
CPC ... H04L 67/02; H04L 51/046; H04L 12/4625; H04L 67/26; H04L 51/32; G06F 16/00; G06F 16/9558; G06F 16/9566
USPC .................................. 705/26.1–27.2; 706/21
See application file for complete search history.

(56) References Cited

U.S. PATENT DOCUMENTS

| | | | |
|---|---|---|---|
| 2004/0064351 | A1 | 4/2004 | Mikurak |
| 2006/0026237 | A1 | 2/2006 | Wang et al. |
| 2009/0175331 | A1 | 7/2009 | Karczewicz et al. |
| 2011/0035687 | A1 | 2/2011 | Katis et al. |
| 2012/0297031 | A1 | 11/2012 | Danielsson Fan et al. |
| 2013/0080362 | A1* | 3/2013 | Chang ................ G06Q 30/0255 706/21 |
| 2013/0290532 | A1 | 10/2013 | Richardson et al. |
| 2014/0257929 | A1 | 9/2014 | Du et al. |
| 2014/0278783 | A1 | 9/2014 | Du |
| 2014/0288945 | A1* | 9/2014 | Boerner ................ G06Q 50/22 705/2 |
| 2015/0221007 | A1 | 8/2015 | Peter et al. |
| 2015/0339745 | A1 | 11/2015 | Peter et al. |

* cited by examiner

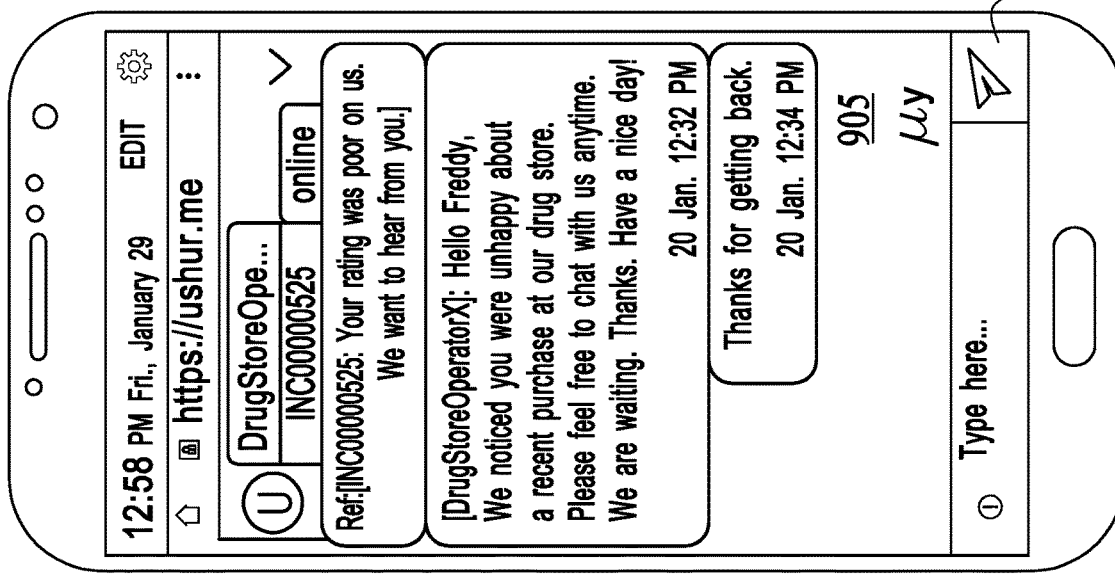
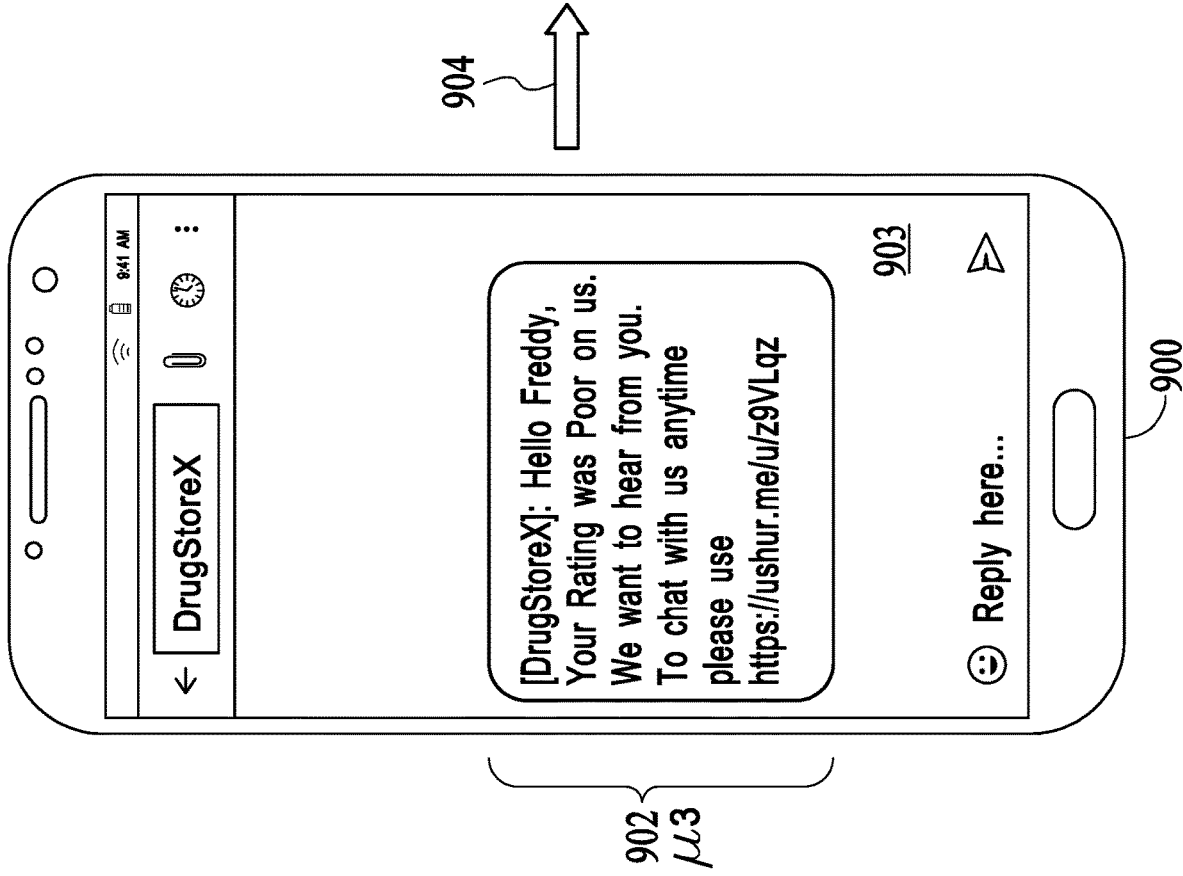
FIG. 9

SYSTEM AND METHODS FOR A MICRO-ENGAGEMENT PLATFORM

CROSS REFERENCE TO RELATED APPLICATIONS

This application claims the benefit of the filing date of U.S. Provisional Patent Application Ser. No. 62/298,342, filed on Feb. 22, 2016, which is incorporated herein in its entirety by this reference. This application is also a continuation-in-part of pending U.S. patent application Ser. No. 14/607,034, filed on Jan. 27, 2015, which claims the benefit of U.S. Provisional Patent Application Ser. No. 61/932,170, filed on Jan. 27, 2014; and a continuation-in-part of pending U.S. patent application Ser. No. 14/812,256, filed on Feb. 2, 2015, which claims the benefit of U.S. Provisional Patent Application Ser. No. 61/934,797, filed on Feb. 2, 2014, all of which are also incorporated herein in their entireties by this reference.

BACKGROUND OF THE INVENTION

With the ubiquity of mobile devices, messaging as a form of communication has increased greatly. Although mobile messaging is more dominant among people in social contexts, the same mode of engagement is being sought by businesses. Statistics on consumer behavior have shown that mobile messaging gets the attention of people much more than traditional engagements like emails, phone calls and web portals. It is no surprise that businesses are beginning to focus on mobile messaging as a medium of engagement with their customers. Customers on the other hand, do not want to get stuck with a committed mode of engagement. IVR (Interactive Voice Response), Desktop Web Chat fall under this category of committed engagements where the customer has to start and complete the engagement all at once. Other traditional forms of engagement like email and webpages are designed to put lengthy information in front of customers and having them consume that and take action all at once. This is in direct contrast to what customers are willing to do, given the information overload and lack of attention and time they are constantly dealing with. Some of the existing mechanisms in the field send a text message with a web link but the link itself points to the entire web page with a lot of content that becomes a committed engagement for customers and they end up ignoring or postponing the engagement.

Customers want to be on the move and engage quickly. The present invention enables an engagement to be broken down to a collection of various micro-engagements that can be created and intelligently launched to customers.

The micro-engagement platform according to the present invention transmits a snippet of information to a customers mobile device that can be viewed and responded to quickly. When one micro-engagement is completed by the customer, the platform serves the next micro-engagement and eventually serves all micro-engagements in the sequence thereby achieving the overall goal of user engagement.

Use of Terms:

The terms—customers and consumers are used interchangeably and refer to the same or similar entity. The terms businesses, enterprises, companies are also used interchangeably and refer to the same or similar entity. Depending on the type of business—an online marketplace or a social network or an ecommerce website, these terms are changed as relevant in those contexts. The term user applies to administrators in a business who may use the micro-engagement platform or software components that may use the system and is made clear based on context. The term goal or campaign is used interchangeably and means the same thing. The term menu implies a set of options presented to the customer as part of a single micro-engagement. The term engagement in many of the contexts below may actually mean micro-engagement and hence the context is the driving factor there. The invention is not limited to specific customers or specific businesses and also not limited to business to customer engagement. The term communication channel refers to a mode of transmitting and receiving micro-engagements such as, but not limited to, SMS, Internet Protocols with web browser, mobile apps. The term push refers to the mechanism of initiating one or more goals to the customer mobile device over a communication channel by the user of the platform including but not limited to an administrator of the platform or by a remote enterprise system using an application programming interface. The term pull refers to a customer initiating a goal over a communication channel supported by the platform.

DESCRIPTION OF THE RELATED ART

Customer engagement is critical for businesses. With the advent of telephony, businesses have relied on telecommunication for customer engagement by advertising toll-free numbers that customers can call into. With the advent of the Internet, businesses have encouraged customers to go to their websites and have provided engagement tools on the webpages.

With the advent of mobile devices, consumer behavior has changed rapidly and businesses are still coping up with this change. There has been much work done in bringing web contents to mobile devices (U.S. Pat. No. 9,071,571 B2, U.S. Ser. No. 12/209,977, U.S. Pat. No. 7,716,281 B2) where the devices have become smarter so as to present the entire web contents to to the mobile device, that was previously only accessible to desktop/laptop computers.

With the smart mobile devices proliferating, businesses have started focusing on their web content to become mobile-friendly. Businesses are also coming up with mobile apps (applications that can be downloaded from online app stores) to engage with their customers. All of these efforts are to enable customers to easily and quickly engage with businesses.

Interestingly, consumer behavior with these smart mobile devices is changing so radically that businesses are trying hard to maintain and grow the engagement rates with their customers for their mobile apps. Particularly challenging is the scenario where the mobile app is not actively running on the mobile device and much work has gone into getting the customer's attention by way of push notifications. Incrementally, there are efforts being pursued to get customers to engage through the push notification by presenting a call to action to the customer through that notification. Mobile apps are representative of what businesses want to provide to their customers and not necessarily what the customer needs. The usage of push notifications highlight the fact that customers need their attention to be drawn to something rather than assuming they will periodically open and spend time on a business mobile app.

Customers have been using social networks for social interactions and engagements. Because of the high engagement rates on these social networks, businesses are coming up with a mobile strategy to engage with customers on social media. What is not yet proven is whether customers are accepting of business engagements on the same channels they are using for their social interactions. What is clear is that people don't want to spend much time interacting with a business through a committed engagement like a phone call or web chat. What is also clear is that websites are loaded with too much information and customers don't want to sift through all the information on websites to get what they are looking for. Customers are expecting to complete their information search quickly.

Another way of communicating with customers is by the use of notifications via SMS. Businesses like shipping companies notify tracking information on the shipment to customers. These notifications are convenient for customers to track and be informed about, rather than expecting customers to visit the website to track shipments. Businesses also are notifying customers and sending a website link in that notification. When clicked, these links land the customers on the website and force customers to login to their accounts for any further engagement, something that is a barrier for customers to seamlessly interact with the business.

All of these trends have led to information overload and decision fatigue for customers. What is needed is a micro-engagement platform that is capable of segmenting the entire engagement that a business seeks to have with its customer into short snippets of information, requiring only a short amount of time from the customer to engage with, which we call micro-engagement. Micro-engagements can be delivered to customers through multiple modes such as SMS, mobile browser and mobile apps.

SUMMARY OF THE INVENTION

The various embodiments of the invention presented here demonstrate how an overall goal of engagement with mobile customers is broken into individual pieces of micro-engagement along with the designed flows. These micro-engagements are delivered to the customers' mobile devices in multiple modes of engagement. The recipients of these micro-engagements can either respond immediately or at a later point in time. Progress of the engagements are presented to the user/administrator of the system, to allow the user to perform analytics on the collected data and to monitor the progress of the overall goal.

In one embodiment of the present invention, a micro-engagement platform for enabling a user to build a goal in the form of a plurality of micro-engagements and to cause these micro-engagements to be coupled one at a time to a customer mobile device for enabling interaction by the customer with each micro-engagement comprises: a goal builder for enabling the user to input a plurality of short information snippets, each designed to be separately transmitted to a customer mobile device; a data store for storing the information snippets input by the user; an executor for receiving customer mobile device contact data and for controlling the coupling of the information snippets stored in said data store to the customer mobile device as a series of micro-engagements and, when defined by the user, for receiving a response to one or more of said micro-engagements from the customer's mobile device; and a plurality of edge gateways for causing the micro-engagements to be output to the customers mobile device via a selected one of a plurality of communication channels.

In another embodiment, the present invention comprises a method to create, launch and administer goals in a micro-engagement platform, the method comprising: creating and storing a plurality of goals, each goal comprising one or more micro-engagements: uploading and storing customer mobile contacts in said micro-engagement platform; pushing one or more goals to one or more customers' mobile devices; enabling a customer to initiate one or more goals stored in the micro-engagement platform from his/her mobile device; receiving a response to one or more micro-engagements from the customer's mobile device; and selecting one of a plurality of communication channels for each micro-engagement for transmitting that micro-engagement to the customers mobile device.

In another embodiment, a user who has an account with the micro-engagement platform intends to create a survey consisting of 3 parts. Each part is represented by a menu with 3 to 5 options. The goal here is a survey and the entire goal consists of 3 menu options. The user accesses the platform and uses the goal builder tool to create a goal with 3 menus. Each menu is a micro-engagement and the goal builder tool allows the user to create the flow from one menu to the next. The user enters the mobile device contact information of the customers into the platform and pushes the goal to the customers. The platform sends the first menu which is the first micro-engagement in the goal to the customers. In one embodiment, the micro-engagement platform delivers the menu in a text format, prompting the customer to make a selection by replying with numerical value that corresponds to the choice presented. In another embodiment, the micro-engagement platform delivers a link to the customer and upon clicking the link, the customer is presented a set of options that is graphically rendered in the browser. The user of the system decides what modes to deliver the engagements as part of building the goal. The user may choose to deliver the entire goal over SMS or use a combination of SMS and the browser link. In either case, each micro-engagement is sequentially delivered to the customer. The platform keeps track of the status of the engagement and always presents the customer with the appropriate micro-engagement. The system records the response from the customer and knows that how many menus are to be notified so as to finish the goal. If the customer does not respond to a menu presented, the system optionally notifies the customer of the pending micro-engagement and the customer can continue engaging with the goal until the goal is fully realized.

In another embodiment, the micro-engagement platform has many built-in templates for various well-known goals. One such template is a goal to automate updating of customers' expired credit cards. A user of the platform configures the goal and using the APIs provided by the platform, provisions customer data from the remote business enterprise system into the platform. The remote business enterprise system, evaluates customers' expiring credit cards and for the credit cards that are expiring, the remote enterprise system invokes an API to trigger the goal. The goal builder extracts the relevant enterprise data that was previously provisioned into the platform, and based on the customer identity inserts that customer's data to specific parts of the micro-engagements just prior to sending out the micro-engagements to the customer.

In another embodiment as part of the goal template, the micro-engagement platform presents an authentication request to the customer. Upon collecting the customer authentication information, the platform validates the customer following which the next micro-engagement to update the credit card details is presented to the customer. In another embodiment, the customer gets further micro-engagement to continue to update the expiry date but if the customer chooses to not provide the updated credit card information, the platform recognizes that the customer has not completed the goal and would notify the customer on the pending micro-engagement. In another embodiment the customer completes the full goal in one step following which the remote business enterprise system invokes an API and successfully obtains the updated credit card information from the platform.

The micro-engagement platform monitors the campaign status at a micro-engagement level and branches off accordingly based on customer responses as per goal flow but also based on certain dynamic properties such as time-out, user/administrator introduced parameters like goal expiry, or even goal updates where the flow can change. Since the platform operates at a micro-engagement level, any change to the goal can be introduced dynamically by the platform user while the customer is still engaging with the goat The distinct impact with such a platform is that the customer is not forced to complete the entire goal at a time or within a stipulated time although a customer may choose to finish the entire goal.

While most of the embodiments of the present invention presented here are scenarios involving businesses and their customers, the invention is not limited to such scenarios. For example, in one embodiment an account user on this system could create a goal and push it to his/her friends for a social interaction. In another embodiment, a community representative may publish a goal and have community members engage with the goal by pulling from the platform using an addressing method published by the community representative. Such addressing methods may involve having the customers to text in some keywords that can trigger a goal or allowing a customer to click a link that can in turn trigger and launch a goal to the customer. In monitoring the responses, the representative gets to see the status, and results of the member interactions feedback, polls, etc., of their community for that campaign.

Thus the micro-engagement platform enables goal automation through a sequence of micro-engagements and goal automation can be deployed for a variety of applications both in a business setting as well as a social setting.

BRIEF DESCRIPTION OF THE DRAWINGS

FIG. 9 illustrates how one micro-engagement which is via SMS can lead into another micro-engagement. The figure shows how one micro-engagement is prompting the customer to chat with a customer representative in real-time instantly.

The figures here depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The Micro-Engagement Platform according to the present invention supports creation of engagements for businesses with their mobile customers. However, in contrast to earlier and existing, forms of customer engagement where web contents are delivered either as-is via a URL link or customized to suit for the mobile device, this proposal is aimed primarily to approach the engagement recognizing that mobile customer behavior has changed. The engagement mechanism itself has been redefined to focus on two properties. First one being the information itself is concise and sufficient for the problem at hand. Second one being that the engagement would require at any given time only a short snippet of time from the customer. In order to satisfy the first property we introduce goal builders where goal is the intended overall problem to be solved. The output of the goal builder will produce multiple related micro-engagement pieces where each individual micro-engagement can be delivered to the customer and can remain persistent perpetually until the customer engages with that micro-engagement. The micro-engagement platform allows for creating such micro-engagements as part of the goals and then delivers them to the customers to achieve the overall intended goal over a period of time which can be short or a very long period of time which depends on the goal properties. The underlying concern of the micro-engagements is about mobile customer conversions, which is to gain their attention and get a response from them rather than just presenting them all the rich content that the Internet has to offer either via emails or via website contents which is what has led to decision fatigue and engagement fatigue for customers.

Figure 1:
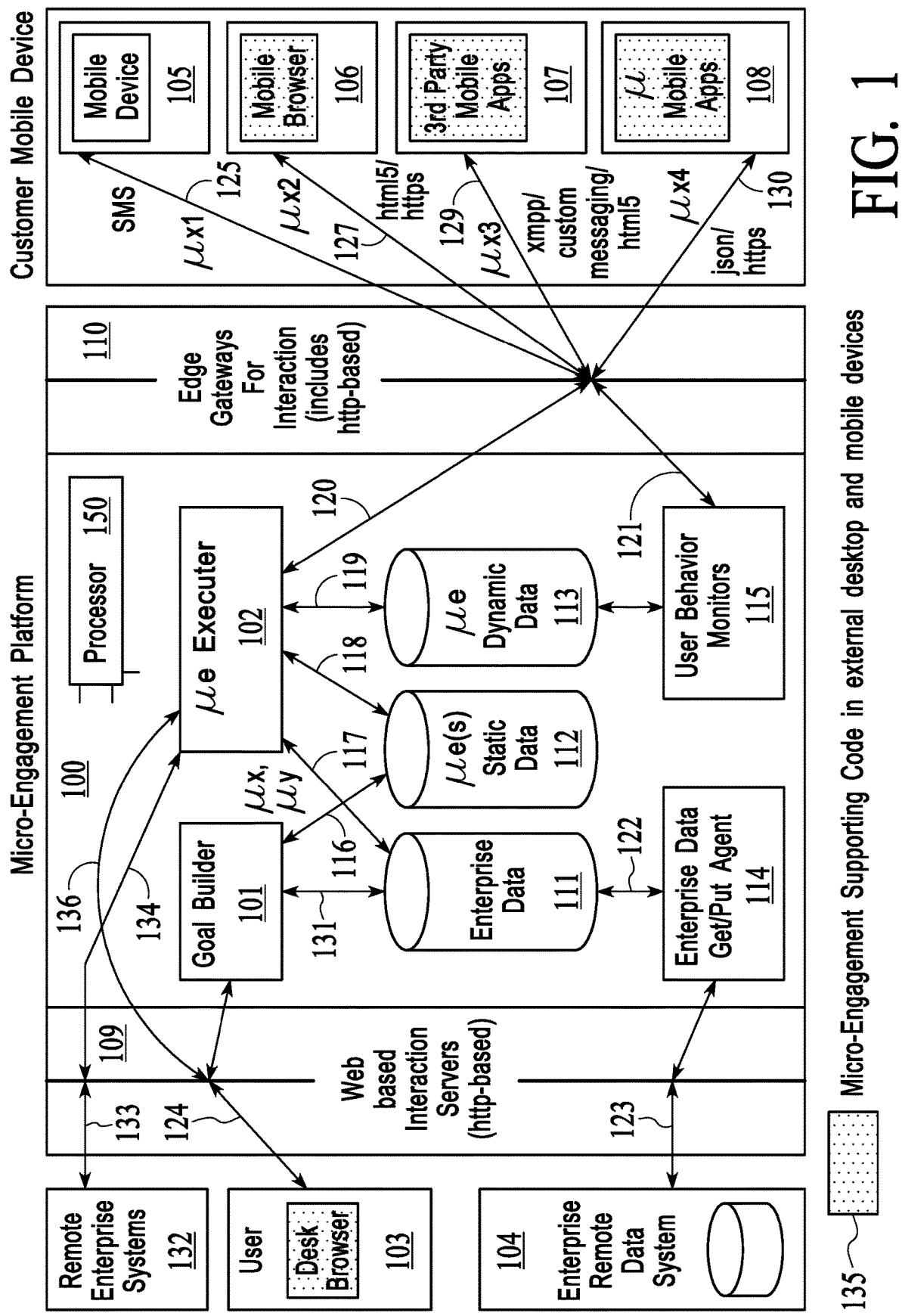
FIG. 1 illustrates the essential components of a micro-engagement platform according to the present invention.

FIG. 1 illustrates the components of the Micro-Engagement Platform 100 as well as external entities that would be involved in the interactions. Some of the logic of the micro-engagement solution is present as code/scripts (like javascript, css, html) in external entities like the desktop browser 103 as well as in a customers' mobile device browsers 106 and mobile device apps 107, 108. In one embodiment, a user 103 who is either an administrator for an enterprise or who owns an account with the micro-engagement platform based system, creates a complete goal using goal builder 101 (see also FIG. 2B, 207-222, FIG. 2A 223). The goal comprises one or more micro-engagements. Goal builder 101 internally stores 116 the micro-engagements created by user 103 in the static data store 112. Then user enters mobile contact data of customers and then pushes the created goal 124 which is taken up 136 by the micro-engagement executor 102 which takes the first micro-engagement and, provided it has no variables, executor 102 will push 120 the micro-engagement via the edge gateway 110. The edge gateway 110 is aware of the presence of the customer if the customer is in a browser mode 106 engaging with the platform 100, if the customer is in a 3rd party mobile app 107 where there is a connection with the platform 100 or if the customer is in a dedicated app 108 provided on behalf of the solution built on the platform 100. If the customers presence is not known to the edge gateway, such as connection to the platform 100 is not detected, then the edge gateway 110 by default will reach out to the customer via SMS 125 mode to the customers mobile device 105. For the SMS 125 mode of operation only the phone number of the customer is sufficient to deliver a micro-engagement to the customers mobile device 105. When the customer 105 responds to the first micro-engagement message via his or her mobile device, the edge gateway receives it 126 and then forwards 120 the response to the executor 102. The edge gateway also indicates 121 the occurrence of this particular customer response to the user monitor 115, so that the user monitor 115 derives some statistics about this particular customer using the customers mobile contact data The executor 102 processes the response, feeds and uses 119 the dynamic data on this engagement as well as the goal, picks up the next 118 micro-engagement and again, when there are no enterprise variables, launches 120 the contents back to the edge gateways 110 to 125 the same mobile device 105 in this embodiment. In this embodiment, the platform 100 allowed a user 103 to create a goal that constituted multiple engagements. These were treated as micro-engagements by the executor 102 using all the supporting components of the platform 100.

In one embodiment, all of the components of micro-engagement platform 100 are controlled by a central processing unit, shown as Processor 150 in FIG. 1, in a conventional way known in the art.

In another related embodiment, after the user 103 has created a goal for the engagement, the goal can be referred to by an application programming interface, API 133, and used by a remote enterprise system 132 to launch 134 the goal. Now the executor 102 takes up the goal as before and starts executing on the goal via the micro-engagements. The difference in this embodiment being that the user 103 is not a person having to push the goal but rather the user is a remote enterprise system invoking the goal via an API 133 offered by the system using the micro-engagement platform 100.

The API 133 is an interface that specifies a list of supported methods by the platform 100 as well the necessary parameters for each of those methods. In the present invention, the API scope is about invoking methods on the platform 100 to launch the goal that triggers micro-engagements as well as to retrieve any further information about the micro-engagements associated with the goals. In this embodiment as well, processor 150 is responsible for the underlying execution of all tasks mentioned in the platform 100, including the API invocations 133.

Figure 4:
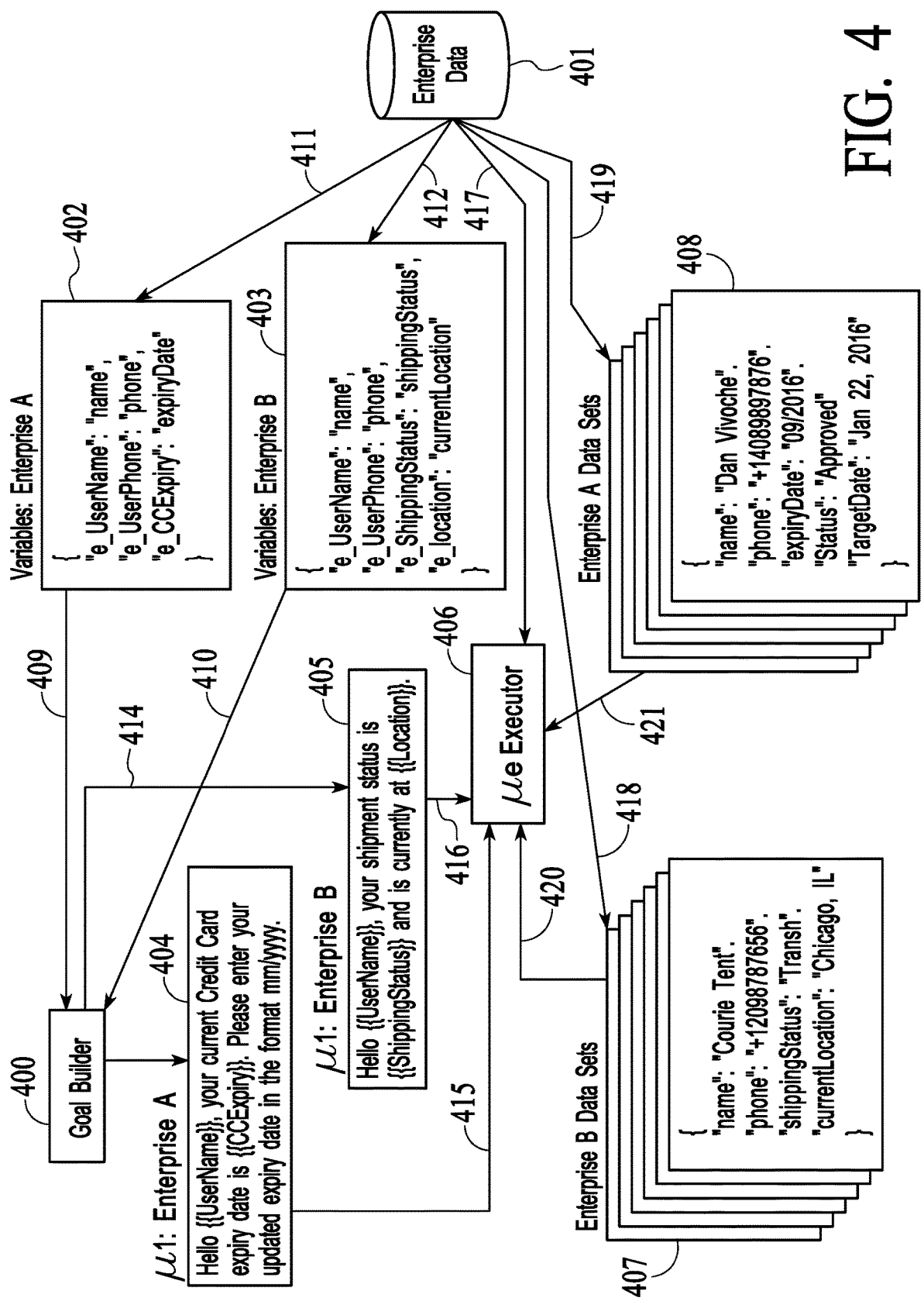
FIG. 4 illustrates how the contents of the micro-engagements are interseeded by enterprise variables whose data will be fetched from the remote enterprise system and configured in the platform. The Micro-Engagement executor that maps the enterprise variables in the micro-engagement contents to the actual enterprise data is highlighted in this illustration.

In another embodiment where the micro-engagement message requires data from an enterprise remote data system 104, the enterprise variables necessary to operate on the enterprise data are pre-configured into an enterprise data table 111. It is the user 103 who through the goal builder (FIG. 4 400) introduces (FIG. 4 413) the enterprise variables into the micro-engagements (FIG. 4 404). For this particular enterprise, the goal builder 101 exposes the variables to the user 103 when forming the entire goal. The user 103 inserts the variables (FIG. 2B, 208) into the micro-engagement data. In one embodiment of the invention, the enterprise data is co-resident on the platform rather than a remote enterprise system. Hence there is an independent component 114 Enterprise Data Get/Put Agent that can periodically retrieve 123 data from the remote enterprise system 104. The micro-engagement platform 100 is intended to support various remote enterprises 132, 104. So in this embodiment, after enterprise variables are introduced into the micro-engagements and the goal pushed 124 or triggered 133, the executor 102 analyzes the content and finds enterprise variables and hence does lookup 117 on the enterprise data which contains the variables and the enterprise data. The executor 102 then replaces the enterprise variables in the content with the actual enterprise data and forwards the content as before to the customer.

In another embodiment when a URL link is generated by platform 100 based on a goal created by a user (see, for example FIG. 5 501), this link is sent to the mobile customer 105. When the customer clicks on the URL, the mobile browser 105 is launched on the customer's device which engages back 127 with the platform 100 whereby the edge gateway 110 takes care of notifying the executor 102 as well as the user monitor 116 via 121. The mobile browser script 106 running on the mobile device also takes care of constructing the information that can be handled by the edge gateway 110 and rendered appropriately to the executor 102. The executor 102 is expected to be independent of the modes (125, 127, 129, 130) of engagement with the customer's mobile device. However, it is expected that based on the intended mobile device rendering (whether SMS or browser or apps) the goal builder 101 will have certain provisions for the user to indicate the type of desired engagements. The URL link (FIG. 5 501) which is an alias to the micro-engagement is internally generated by the platform 100 providing an option for the customer to either engage via SMS 125 or through the browser 127. However, in another embodiment, a URL link can be introduced by the enterprise user 103 into the micro-engagement (FIG. 4 404) where the URL link can be a reference to any website.

The executor 102 combined with the goal builder 101, edge gateways 110 and the scripts in mobile devices (106, 107, 108) as well as desktop browser 103 work together so that the goal and hence the micro-engagements are written once and can be rendered and engaged on various modes 105, 106, 107 and 108. However, there are some micro-engagements which can be forced to be rendered only in a certain mode like 106 and cannot be delivered via other modes, e.g., mode 125. This can be for security reasons as well as the limited capabilities of some devices 105 (one that supports SMS but not browsers, for example).

FIG. 1 illustrates a customer mobile device that can operate on various modes such as 105, 106, 107, 108. In some cases, the device may only support 105 which is SMS mode and not support other modes 106, 107, 108. In a device that supports all of these modes, the same customer at one point can be in 105 mode whereas at other times the customer can be in another mode 106, and similarly in 107 and 108 at different times.

Figure 2A:
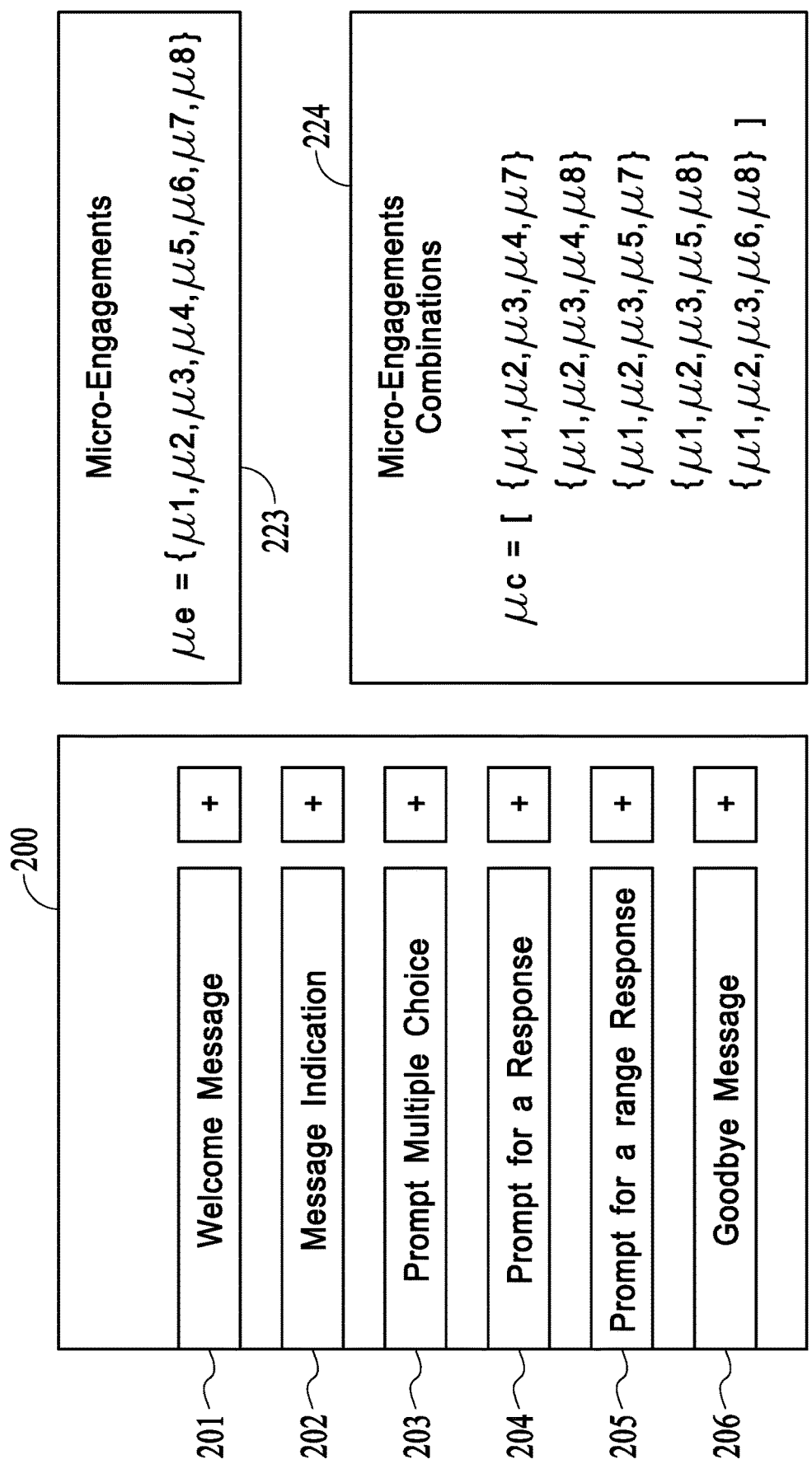
FIG. 2A and FIG. 2B illustrate through a specific example of how a goal or a campaign is translated into several micro-engagements and how the flow among them is created.
Figure 2B:
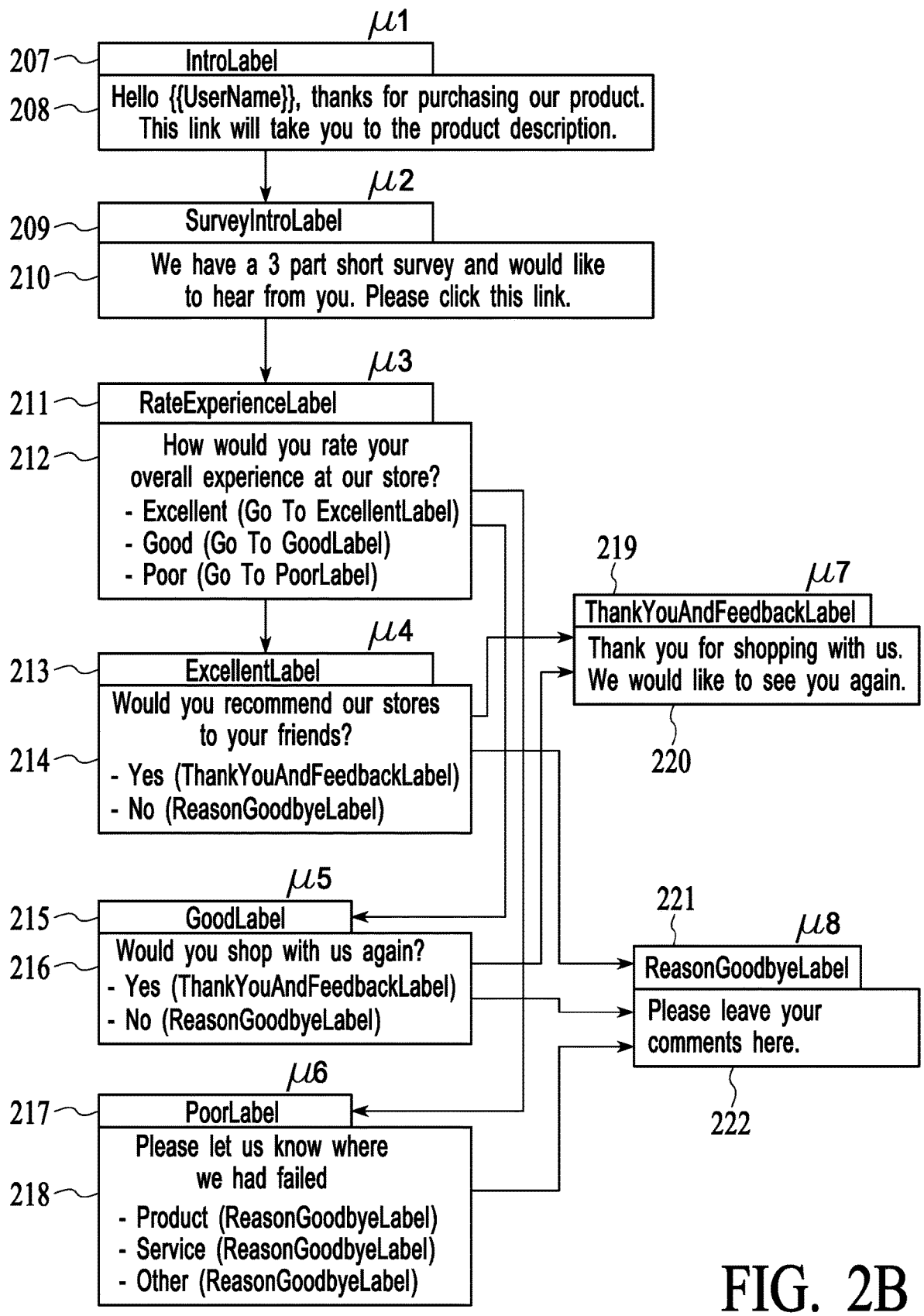

FIG. 2A illustrates how a goal builder might present the various types 200 of messages that are delivered to the customer. The non-exhaustive types shown here include: an initial welcome message 201, then a message indication 202 that can be sent at any time. Neither of these messages are expected to result in the receipt of any customer input. Then there is a multiple choice message type 203 which presents some information to the customer, where a response is expected back from the customer based on the choices presented. When there is a need to get the customer to give feedback via free statements then the type 204 comes into picture. Sometimes there is a need to collect a value from a range such as 1 to 5 from the customer, then the type 205 can be used. Similar to a welcome message, there is a message 206 that can be sent finally at the end of the goal. In one embodiment, there can he 8 micro-engagements 223 that are created and the flow among them supports combinations 224 shown. The visual presentation of this embodiment is shown in FIG. 2B, from 207 through 222. The labels 207, 209, 211, 213, 215, 217, 219, 221 are needed for the transitions to take place between micro-engagements and are created by the user of the goal builder. Allowing the user to create such labels makes it easy for their reference in understanding the entire goal. In another embodiment, the user (FIG. 1, 103) can visit the same goal again and change the flow of the micro-engagements, to change the RateExperienceLabel (FIG. 2B 211) to cause the flow in (FIG. 2B 212) to change from Excellent, for example, to Good, to cause the micro-engagement to flow to GoodLabel (FIG. 2B 215) rather than ExcellentLabel (FIG. 2B 213). This dynamic change of the flow of micro-engagements will instantly impact the customers who are yet to navigate this flow. So not only does the goal builder allow the user to create and deploy micro-engagements but it can also support dynamic changes to the flow by instantly deploying changes to the user's executing goals.

Figure 3:
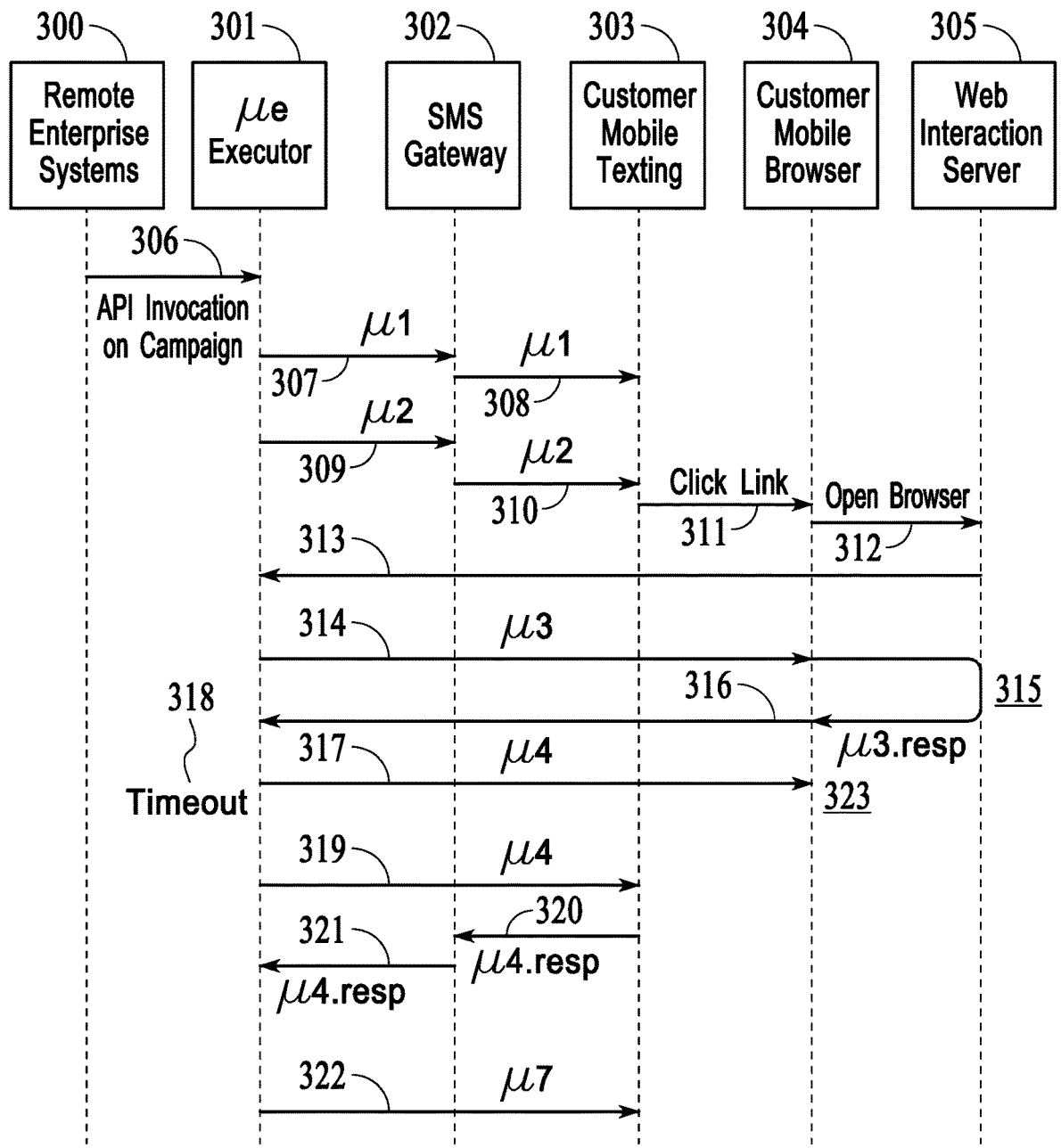
FIG. 3 illustrates the actual execution flow of a set of micro-engagements involved in a particular goat This figure also shows decision branches based on dynamic conditions like customer input and time out. This specific illustration shows how an external invocation from a remote enterprise initiates a goat The figure illustrates the flow with one particular destined customer device.

FIG. 3 illustrates the flow of micro-engagements among the various components in one embodiment of the system according to the present invention. This illustration uses the micro-engagements that were illustrated in FIG. 2A and FIG. 2B. In the embodiment shown, a remote system issues an API call 306 to initiate a particular campaign which the executor 301 receives in its request message and, after retrieving the campaign and the first micro-engagement, to deliver it forwards at 307 to the SMS Gateway 302 which is part of the Edge Gateways (FIG. 1, 110) which delivers it at 308 to the Customer Mobile Device 303. This micro-engagement (FIG. 2B, 208) does not expect a customer response and hence the executor sends 309 the next micro-engagement to the SMS Gateway and reaches 310 the Customer Mobile Device 303. This micro-engagement (FIG. 2B, 208) has a link for the customer to click as an option. The customer clicks the link 311 and the Customer Mobile Devices launches a browser which engages 312 back to the web interaction server 305 (which is part of the Edge Gateway FIG. 1, 110) and reaches 313 the executor 301. The executor initiates 314 the next micro-engagement (FIG. 2B, 211) which is visually rendered on the mobile browser 304. When customer (FIG. 1, 106) responds to that visual engagement that reaches 315 the web interaction server 305, that is communicated 316 back to the executor 301. The executor now initiates 317 micro-engagement (FIG. 2B, 213) to the Customer Mobile Device's browser 304 but the customer does not respond. There is a time-out 318 detected by the executor using the facilities of executor as well as dynamic engagement data (FIG. 1, 113, 119) and hence initiates 319 the same micro-engagement (FIG. 2B, 213) via SMS to the mobile customer 303 (FIG. 1, 105). This time-out based re-engagement can be driven via policies and features offered through the goal builder (FIG. 1, 101). The Customer Mobile Browser 304 that had not responded to the browser based engagement now has the ability to respond to the direct message 319 received via SMS. Once the customer responds 320 and executor receives 321 it the next micro-engagement (FIG. 2B, 219) is sent 322 to the customer on the same channel. In another embodiment, all engagements can take place via the browser and the final thank you message (FIG. 2B, 219) alone may be delivered via SMS for one reason being that the browser may have been closed or the connection lost. These embodiments displaying all possible combinations of micro-engagements highlight that the micro-engagement platform is well aware of all the customer actions and the customer's mobile device status, as much as can be derived, and hence the micro-engagement can support various policies to smartly engage with the mobile device users. With every short link that the platform sends to the customer's mobile device, when clicked, the platform knows which device it is, the mobile contact details associated with that device, and hence notifies the same device via a different mode rather than browser.

FIG. 4 illustrates how to employ enterprise variables into micro-engagements. The platform is intended for customer engagement and when enterprises have to utilize such a system, it is the remote enterprise system that has customer data and the data to be sent as pail of the engagement. The goal and micro-engagements created on the platform have to utilize this customer data that come from the remote enterprises. This is regardless of whether the platform is employed as a SaaS (Software-as-a-Service) or in a private cloud of the enterprise. The micro-engagement platform by itself is independent on how the micro-engagement data is arrived at but, in order to be able to cater to the needs of enterprises, we need to be able to accommodate enterprise data. In one embodiment, the goal as illustrated here in FIG. 4 is to offer credit card expiry notice to the customers and have them update their new expiry date. Before the goal builder 400 can enable the user (who can be an admin from the enterprise) to create 413 a micro-engagement 404, the relevant enterprise variables 402 have to be configured within the system. In one embodiment, we see that the variables 402 are to represent customer name, phone number and the current expiry date. The variables that are to be exposed in the goal builder 400 are indicated with a prefix of e_402 implying enterprise. The associated string identity like "name" 402, "phone", "expiryDate" will be the associating elements with the actual enterprise data 408. The enterprise data 408 can contain additional information not yet represented in the goal and hence the variables 402. In the current embodiment, the user visits the goal builder 400 and after initiating to create a new goal is presented with all the enterprise variables 402 indicated as e_X where X is UserName, UserPhone and CCExpiry. The e_may not necessarily be displayed to the user and can be used only for internal identification of the type of variables. There can be other variables needed by the platform including system variables as well as goal instance (or session) associated variables. In this particular embodiment, such a variable may be needed to store the final credit card expiry date as entered by the customer. Now the user completes the content 404 of the micro-engagement for the credit card expiry date update feature introducing the exposed variables 402 at the right places as can be seen 404. When this goal is initiated by any means (either from the goal builder 400 itself or by a remote invocation FIG. 3, 306) the executor 406 analyzes (FIG. 12B, 1206, 1220) the content 404 of the micro-engagement, finds the variables 402 and hence dips 417 into the enterprise data set 408 and replaces the variables with the actual enterprise data. It uses keys such as phone number in this embodiment to identify the actual enterprise data 408 to replace the variables 404 using the associated mapping 402.

In another embodiment, another enterprise (but can be the same as well) 406 uses the builder to notify its customer about the status of a shipment. The variables 403 are configured and show up in the builder 400 for this enterprise and the user places them in the created micro-engagement 405. Upon the initiation of the goal the executor 406 identifies the variables 403 with their mapping, gets the enterprise data 417, 407 and replaces the variables with the actual data and sends them to the customers device.

In these embodiments, we have used a simplified approach of having all enterprise variables in a single scope and hence when an enterprise A 404 comes to the goal builder 400, all its variables across applications (404, 405) will be displayed. In another embodiment, a solution can introduce application keys for each of the enterprise variable set and display only those variables for the specific applications.

Figure 5:
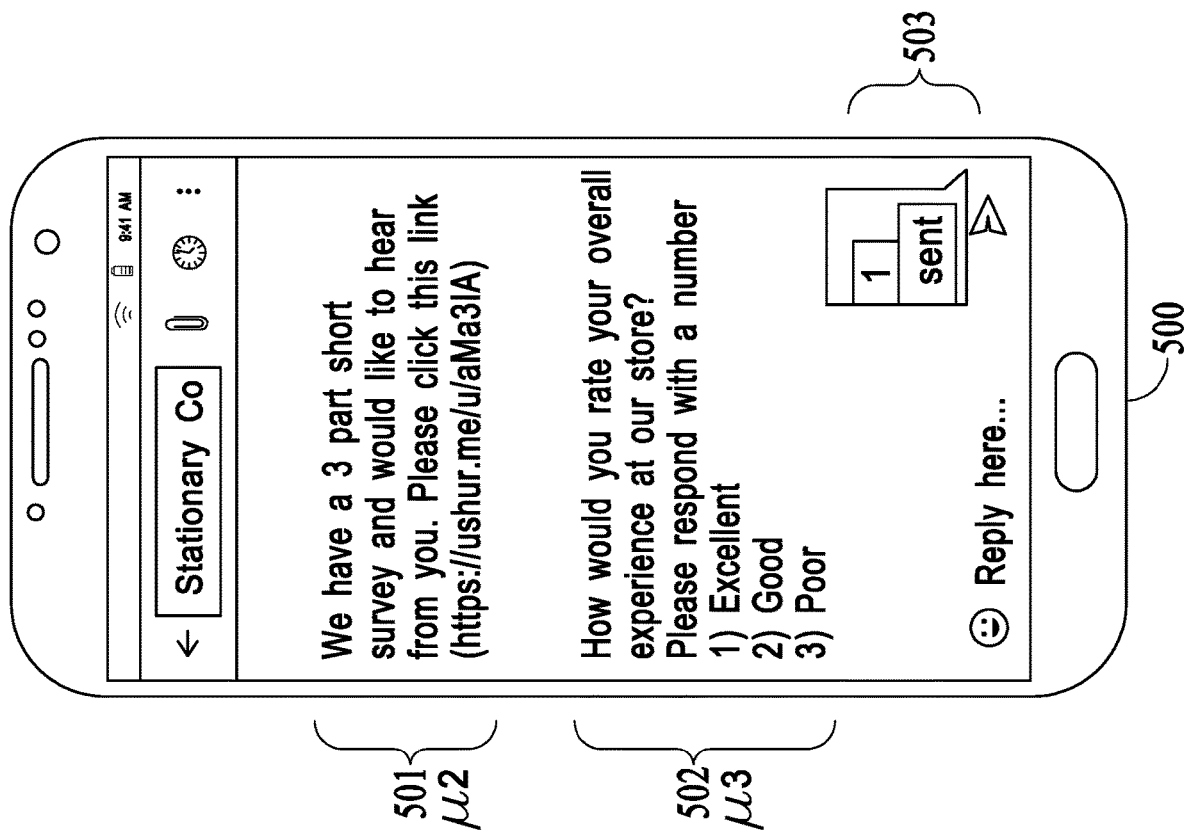
FIG. 5 illustrates two micro-engagements of a campaign that gets pushed via SMS (Short Message Service) to a customer's mobile device. The figure shows how the customer can either click on the link to respond or respond via SMS. In this case, the customer's response via SMS is indicated for clarity.

FIG. 5 illustrates one specific rendering of the micro-engagements 501, 502 on a mobile device. The mode of engagement is SMS and, in this embodiment, we see two micro-engagements 501, 502, one following the other. There is a link 501 for the customer to switch to a visual engagement (FIG.6, 800) if desired or otherwise the customer can respond 503 in the SMS context itself. It is important to take note that the SMS itself can be handled today by various mobile apps and the rendering can be much richer than as shown. In one embodiment, the options can be numeric 502 but there can be other ways of requesting the customer to select a choice within the text based limitation present here.

Figure 6:
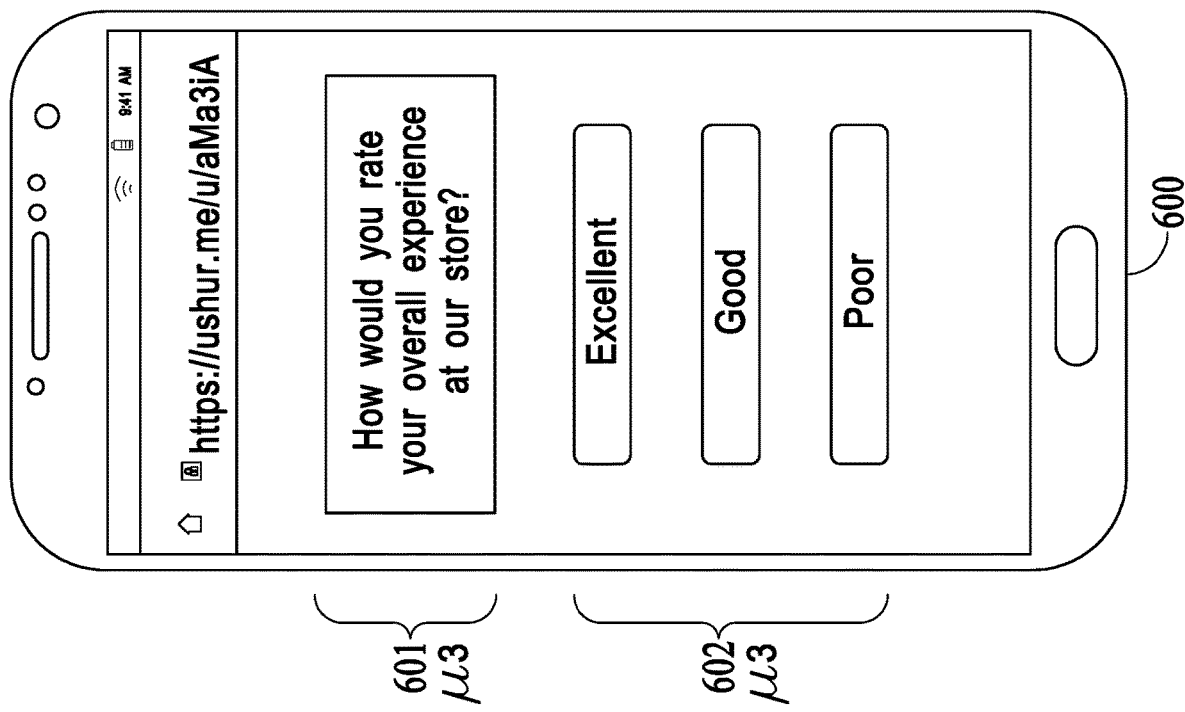
FIG. 6 illustrates the same micro-engagement content rendered visually when the customer clicks on the link.

FIG. 6 illustrates a visual engagement of the same micro-engagement (FIG. 5, 502). In one embodiment, the user could have gotten here FIG. 6 600 from the embodiment in FIG. 5, 501 but in another embodiment a user could have just gotten a single message (FIG. 5, 501) without the FIG. 6, 502 and have the user engage with the browser without that being an option. In the embodiment shown here in FIG. 6, there are actually two micro-engagements 601 and 602. One 601 is an indication alone whereas another 602 expects a response but with the smart interpretation by the script in the browser of customer's device (FIG. 1, 106) they (501, 602) are presented together as one. This highlights various possibilities in smart rendering of the micro-engagements altogether knowing the types (FIG. 2A, 200) of these engagements by the platform (FIG. 1, 100).

Figure 7:
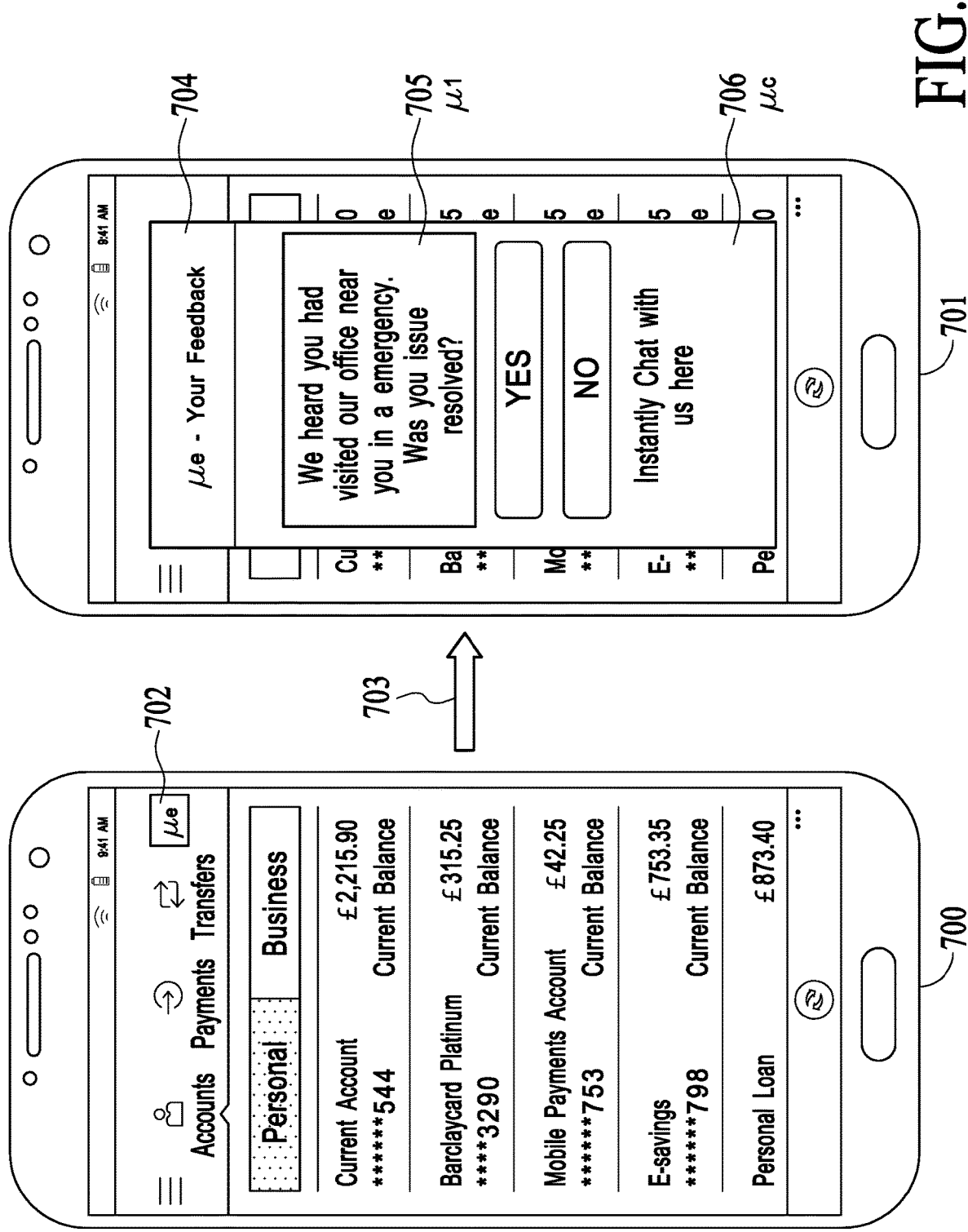
FIG. 7 illustrates how the micro-engagements can take place within a 3rd party mobile app which here is a banking app. Earlier examples of the campaign is chosen here as well for understanding and continuity purposes although the example here is to get the customer experience feedback in banking context.

FIG.7 illustrates on the application of micro-engagements on a 3rd party mobile app such as shown here in the case of a banking mobile app. There is a pre-existing arrangement between the banking mobile app and the provider of the micro-engagement solution that employs the micro-engagement platform. In that arrangement, there is some script (FIG. 1, 107) present within the mobile app that is able to connect with the micro-engagement platform (FIG. 1, 100) and deliver the engagements as and when it is needed. What is important is that the content of the goal or the micro-engagements is not dictated from within the mobile app and can be delivered dynamically and changed dynamically without having any dependency on the development cycle of the mobile app itself. This introduces a huge opportunity for the mobile app vendors to engage with their customers at any given instant and especially in urgent situations to roll-out new features and services that cannot be easily introduced within their mobile app.

In one embodiment with the FIG. 7 illustration is a customer who has signed-in into the banking mobile app. The FIG. 1 can be used here for the illustration of the flow involved in this embodiment. There is an indication FIG. 1, 129 to the edge gateways 110 of the platform 100. The gateway notifies 121 this connection and hence a customer's presence and the context (such as the banking mobile app) to the monitor 115. The executor 102 is informed by the remote enterprise systems 132 to initiate a campaign upon detecting the presence of such a customer. The executor gets notified 119 via dynamic data lookup on the goal that had been initiated. Now the executor will send the micro-engagement 120 which through the same edge gateway 110 will reach the mobile app 107. Now that notification in FIG. 7 results in micro-engagement being shown 702 which, upon clicking by the customer, results in 704 display of the micro-engagements. For this particular customer, based on the enterprise data, the message 705 is conveyed along with the response being expected from the customer. As part of the micro-engagement another chat based micro-engagement 706 is also presented to the customer. Thus, here we see that in a usual banking mobile app the micro-engagements has been introduced allowing the information to reach where the customers are. Dynamic launching of such micro-engagements by the banking app has been made possible. Instead of sending a link to the customer where one can login into their account (websites by themselves typically cannot identify the person or the account), and then expecting them to go through some notification menu and then find the information, here the micro-engagement platform has made it possible for the bank to offer the customer a time-slice in which the bank can get to know their customer's feedback and take appropriate measures. Although in another embodiment a business could have sent similar notification of micro-engagement via SMS, in this illustration of FIG. 7 we see that initiating a micro-engagement to the customer who is already on their mobile app is commendable for the business and this engagement has a lot more chance of gaining the customer attention rather than even an SMS.

Figure 8:
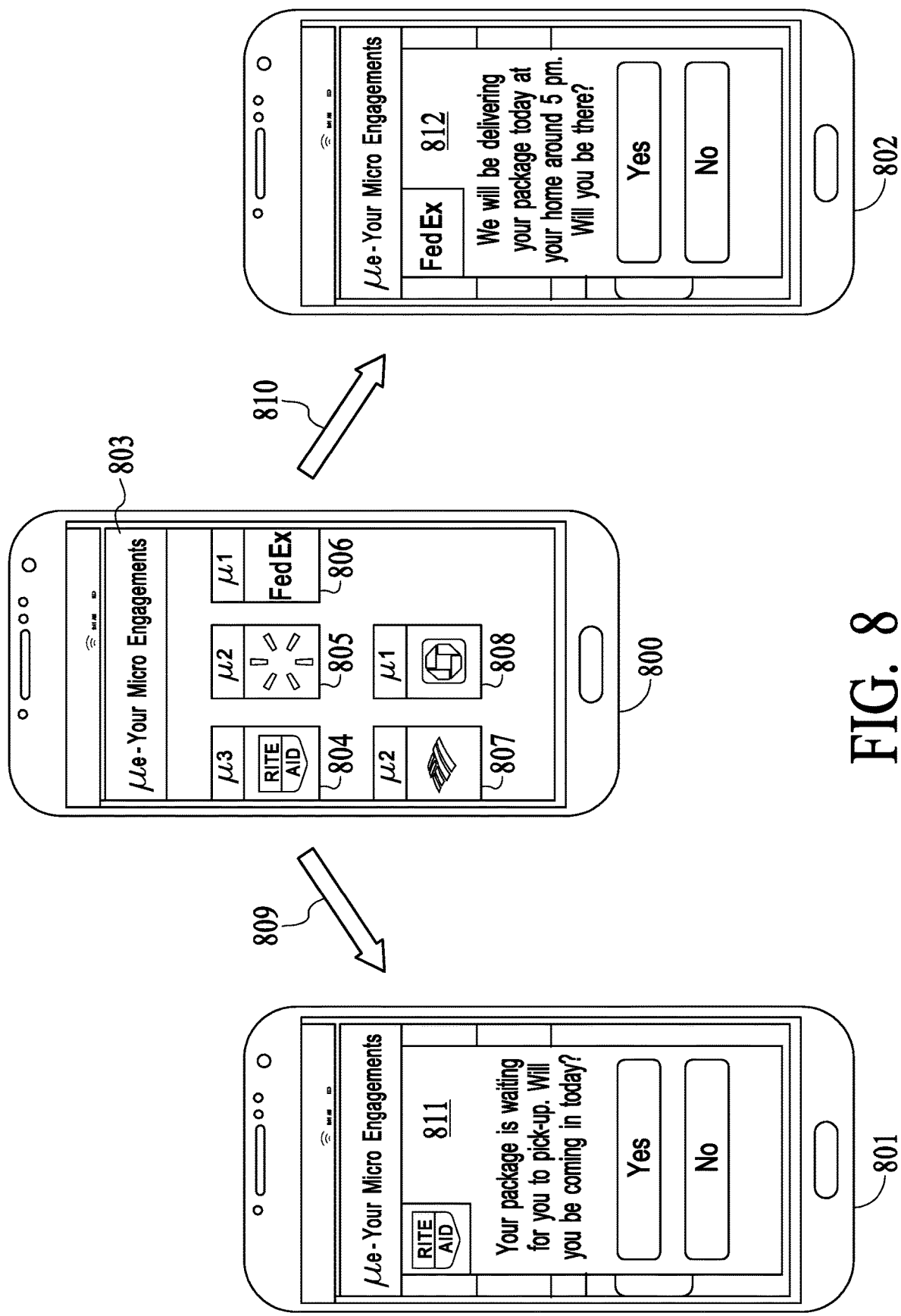
FIG. 8 illustrates how micro-engagements can be captured for a customer within a single micro-engagement centric mobile app that can now aggregate for various contexts and applications. Drug stores, banking, shipping agencies are used here as examples.

FIG. 8 illustrates the application of micro-engagements to customers of businesses on a mobile app (FIG. 1, 108) dedicated for all micro-engagements with various businesses without excluding other possibilities (FIG. 1, 105, 106, 107) of engagement. The executor (FIG. 1, 102) with assistance from other components (FIG. 1, 115, 110 and 105 thru 108) with the policies introduced by the businesses on the system can choose when and how to engage with the customers as they become available in any form on their mobile device. FIG. 8 illustrates some of the businesses that the customer 800 has been engaging with. It shows the number of waiting (804 thru 808) micro-engagements for the customer. In one embodiment, the customer has a micro-engagement 804 from a pharmacy store where a package has arrived and is waiting for the customer to come and pick-up. In this engagement 811 the business wants to know if the customer would be coming in today. This sort of user engagement will greatly help businesses in arranging their packages according to the input from their customers rather than make them wait after they show up at the stores.

In another embodiment, a shipping company 806 has a micro-engagement waiting for the customer 800. In the engagement, it provides information for the customer about a package delivery along with the delivery schedule and enquires if the customer would be there. Based on the responses, the micro-engagements will continue with its flows (FIG. 2B). In another embodiment, the customer can choose 'No' and then, based on the service offered by the shipping company, the customer may postpone the delivery or give other instructions for delivery of the package. If the customer does not respond to any of the micro-engagements here, the business can choose to deliver the same micro-engagement via other modes as illustrated in FIG. 3.

FIG. 9 illustrates the instant and dynamic (via link) chat engagement as part of a micro-engagement because the customer is not committed to a particular time period and can always get back to the same link and converse again. In this illustration, we see that the customer is notified 902 on their mobile device 900 via SMS and clicking the link 903 the customer is landed on a chat page 905 to further engage with the business. All message history is seen and customer can re-engage at a later point using the same link 903. The same sort of chat engagement 901, 905 can also take place from FIG. 7, 706.

Figure 10:
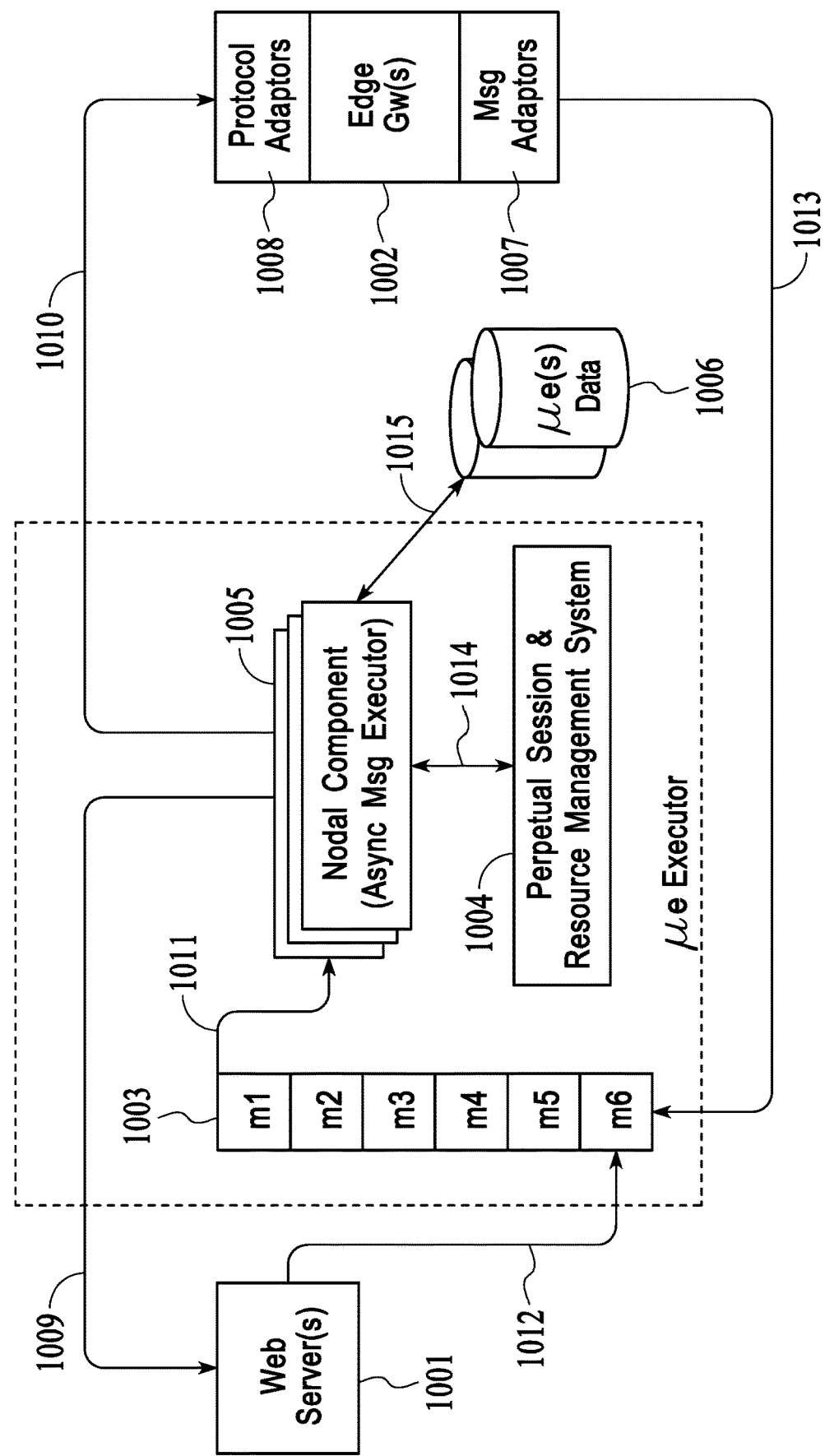
FIG. 10 illustrates the micro-engagement executor flow taking a set of examples for the goal and micro-engagements within it.

FIG. 10 illustrates the internals of one embodiment of a micro-engagement executor 1000 (FIG. 1, 102) along with other supporting components in the micro-engagement platform 100 according to the present invention. Both the web servers 1001 and the edge gateways 1002 interact outside and convert messages over https (secure) into internal messages 1012, 1013 respectively to the message queue 1003 of the executor 1000. The messages where each of them can be a response to the micro-engagement sent outside is picked up 1011 by the internal nodal component 1005 of the executor 1000. The nodal component 1005 is the core processing unit of the executor 1000. It is asynchronous in its mechanism implying that at any given time in the application there is only one message being processed and there will be no blocking to the application thread of execution when it makes network calls but rather that is handed off to other underlying network components and the application thread becomes available to process the next message for the application. There can be multiple nodes 1005 for scalability although that is not essential for the micro-engagement platform. The node 1005 processes the incoming messages and then sends them out 1009, 1010 to the web servers or the edge gateways. For every incoming 1011 micro-engagement, the node 1005 looks 1015 up at the micro-engagement data 1006 and detects any ongoing goal execution which is an instance of the goal. In order to maintain such a persistent session over a long period of time that can handle the goal execution, we employ another system 1004 (Utility application Ser. No. 14/612,256). This system 1004 assists in perpetually storing the sessions and allowing the system 1000 to leverage those sessions upon any micro-engagement 1011 that is getting processed. In one embodiment, a customer may engage with the system after a week or month of notifying the first message (FIG. 6, 602) and the executor 1000 should be able to act upon that response by retrieving the stored session from 1004 along with other micro-engagement data 1016 from 1006. The micro-engagement data 1006 store may only have information about the goal, the micro-engagements and some dynamic aspects of each micro-engagement but the session store 1004 would have everything about the entire history of this particular goal execution and even other related goals for the same user which was relevant in the past executions.

The edge gateways 1002 may have to interwork 1008 between internal messages like JSON (JavaScript Object Notation) to external text messages via https which may become SMS. In another embodiment, there may just be a need to adapt messages 1007 accordingly such as from a mobile app FIG. 1, 107.

Figure 11:
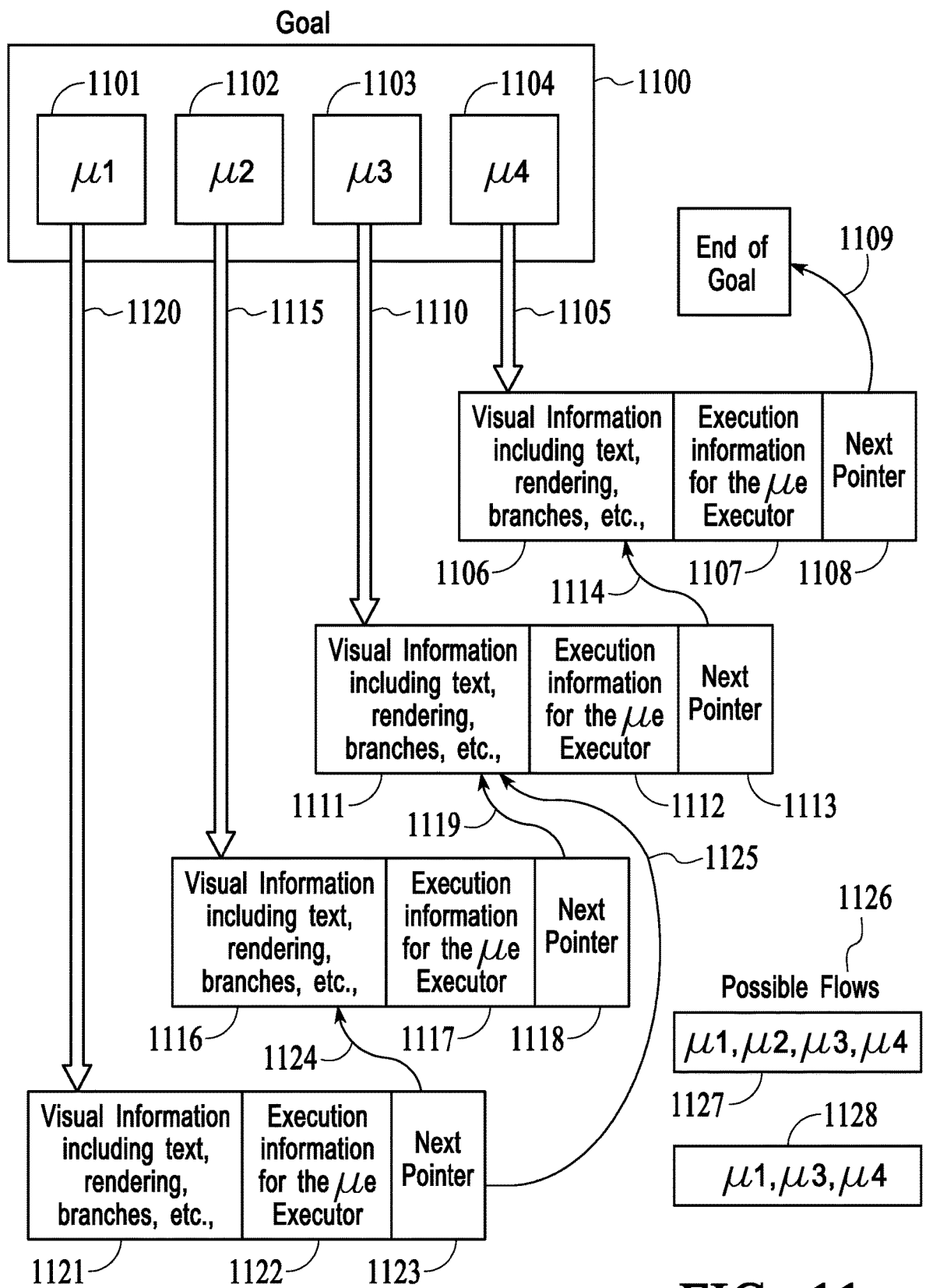
FIG. 11 illustrates how an exemplary goal is structured, the components in those structures and how the components are linked.

FIG. 11 illustrates one embodiment of what constitutes a Goal 1100 in terms of the micro-engagements (1101 thru 1104) it conveys. The Goal is initially created by the Goal Builder (FIG. 1, 101) via a desktop browser FIG. 1, 103. The micro-engagements it creates have visual components FIG. 11, 1106, 1111, 1116, 1121 in this embodiment but also execution components FIG. 11, 1107, 1112, 1117, 1122. The visual components are necessary for the goal builder (FIG. 1, 101) to retrieve (FIG. 1, 116) the goals and present them visually. The execution components are necessary for the executor (FIG. 1, 102) to act on the micro-engagements. Each of the micro-engagement structure also has pointers (FIG. 11, 1108, 1113, 1118, 1123) to the next possible micro-engagements as shown in FIG. 11 for this embodiment. In this particular embodiment shown in FIG. 11, the possible flows 1126 shown are 1127 and 1128. The next pointers are used by both the goal builder (FIG. 1, 101) for visually representing the flow as well as by executors (FIG. 1, 102) to actually execute the micro-engagements.

Figure 12A:
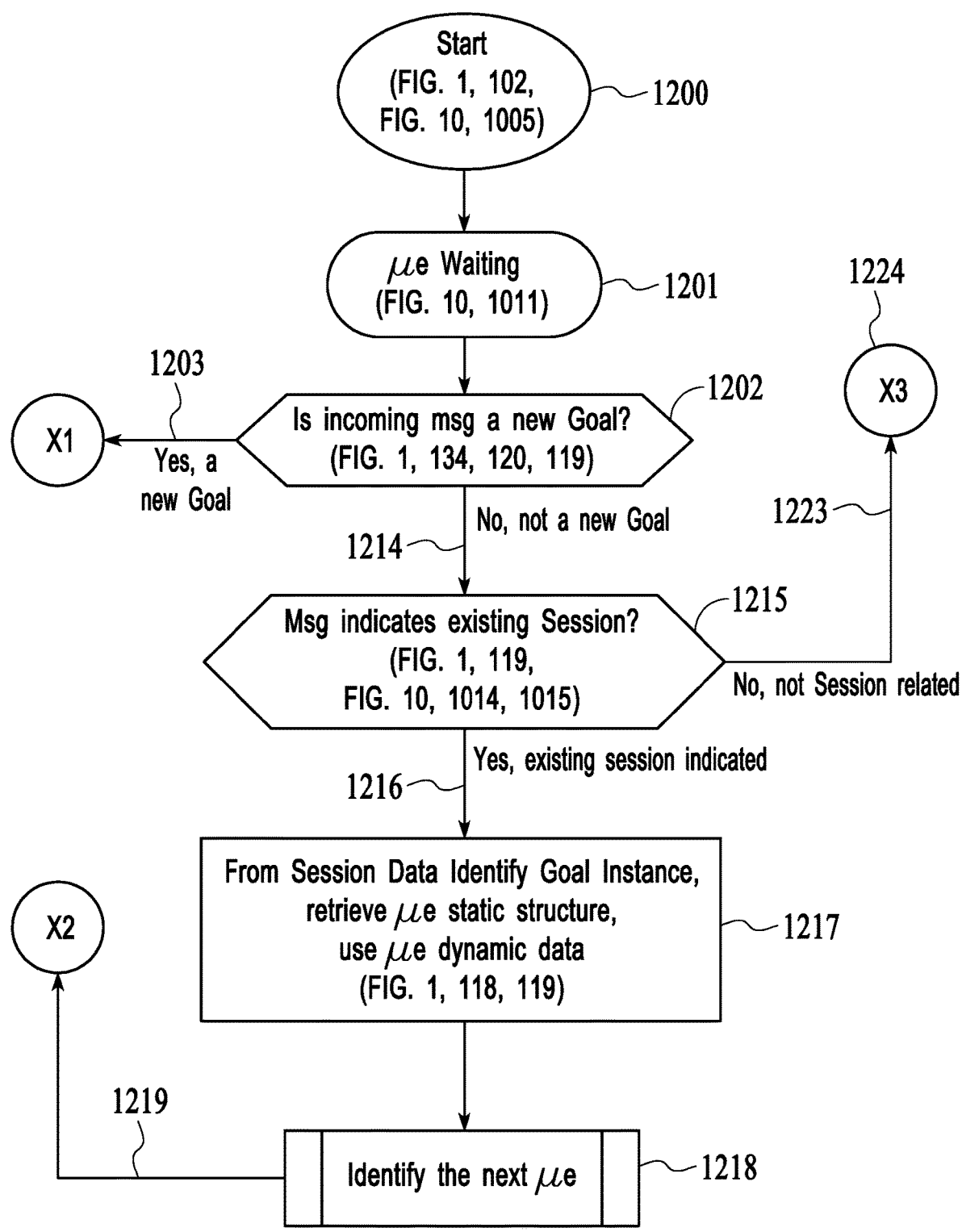
FIGS. 12A, 12B and 12C is a flowchart illustration of what the micro-engagement, executor does along with its dependency on the entire micro-engagement platform.

FIG. 12A illustrates the behavior of the micro-engagement executor (FIG. 1, 102). When not processing any of the messages, it is in a waiting state 1201. The executor is a nodal architecture (FIG. 10, 1000) and is asynchronous in its operation. Upon an incoming message 1202 the executor checks to see if this is for a new goal. If so then it branches off 1203 to process that new goal X1. However, if not a new goal it checks to see 1215 if this incoming message belongs to an existing session that corresponds to a goal instance that had been initiated earlier on. If not related to an existing session, then it branches off 1223 to process that message for other conditions X3 1224. If, however, the message is for an existing session 1216 then it fetches the session data (FIG. 10, 1014) along with all the micro-engagement related static and dynamic data. With it the next micro-engagement to be executed is identified 1218 and branches off 1219 to process that X2.

Figure 12B:
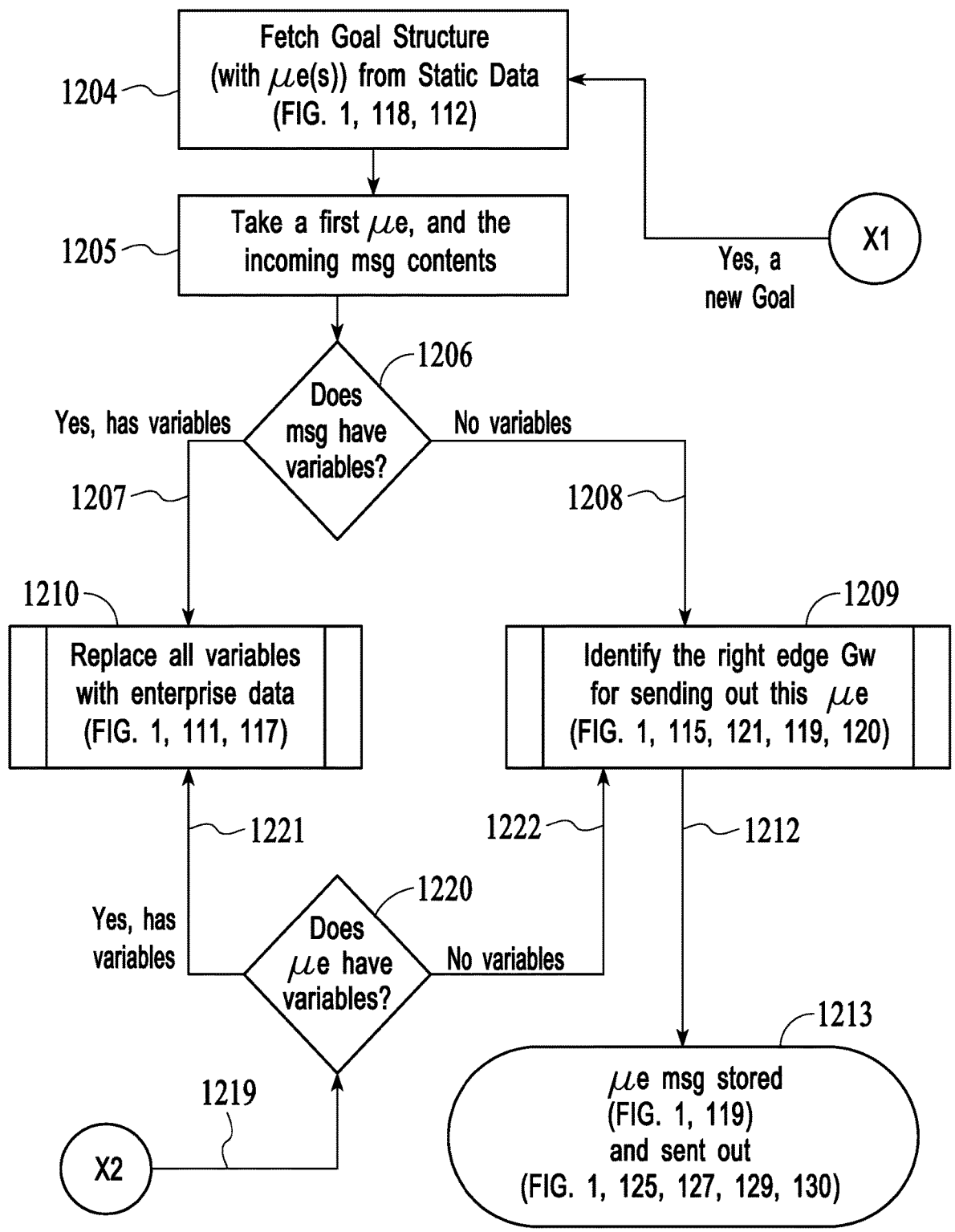

FIG. 12B illustrates the processing of the incoming message for a new goal X1 or in another embodiment it is processing the message corresponding to an existing session X2. For an embodiment where the first message to the executor (FIG. 1—102) is for a new goal the goal structure is fetched with all its micro-engagement structures 1204. After gathering all the related data for that goal the first micro-engagement is fetched 1205 and is processed with the incoming message. Then the executor checks to see if the incoming message has any variables 1206. In one embodiment, the enterprise creates a goal with the variables so as to utilize their enterprise data that is fetched separately (FIG. 1, 123, 114, 122, 111) and hence the variables present 1207 have to be replaced with the actual enterprise data 1210. After replacing all the variables with the actual enterprise data, the final message is to be sent out 1211 after identifying 1209 the right edge gateway to be used to reach this particular user for whom the message is intended. The micro-engagement message is stored and sent out of the edge gateway 1213. If in another embodiment, no variables 1208 are present in the incoming message then the edge gateway is identified to be used 1209 and message sent out 1213 after being stored.

In another embodiment, the incoming message is for an existing session and all information related to that session is retrieved along with the associated micro-engagement data. Now, the message is again checked for variables 1220 and if so, the variables are replaced with enterprise data 1210 and edge gateway identified 1209 and message sent out 1212 after storing the message 1213. In another embodiment, there may not be any variables and hence that message is sent out 1213 after finding out the right edge gateway 1209. In one embodiment, the same edge gateway is used for all the micro-engagements used within a particular period of time but in another embodiment different edge gateways could be used from one micro engagement to the next where the time between them could be large enough for the customer to have moved away from the mode chosen to deliver the micro-engagement, say from the mobile app (FIG. 1, 107).

Figure 12C:
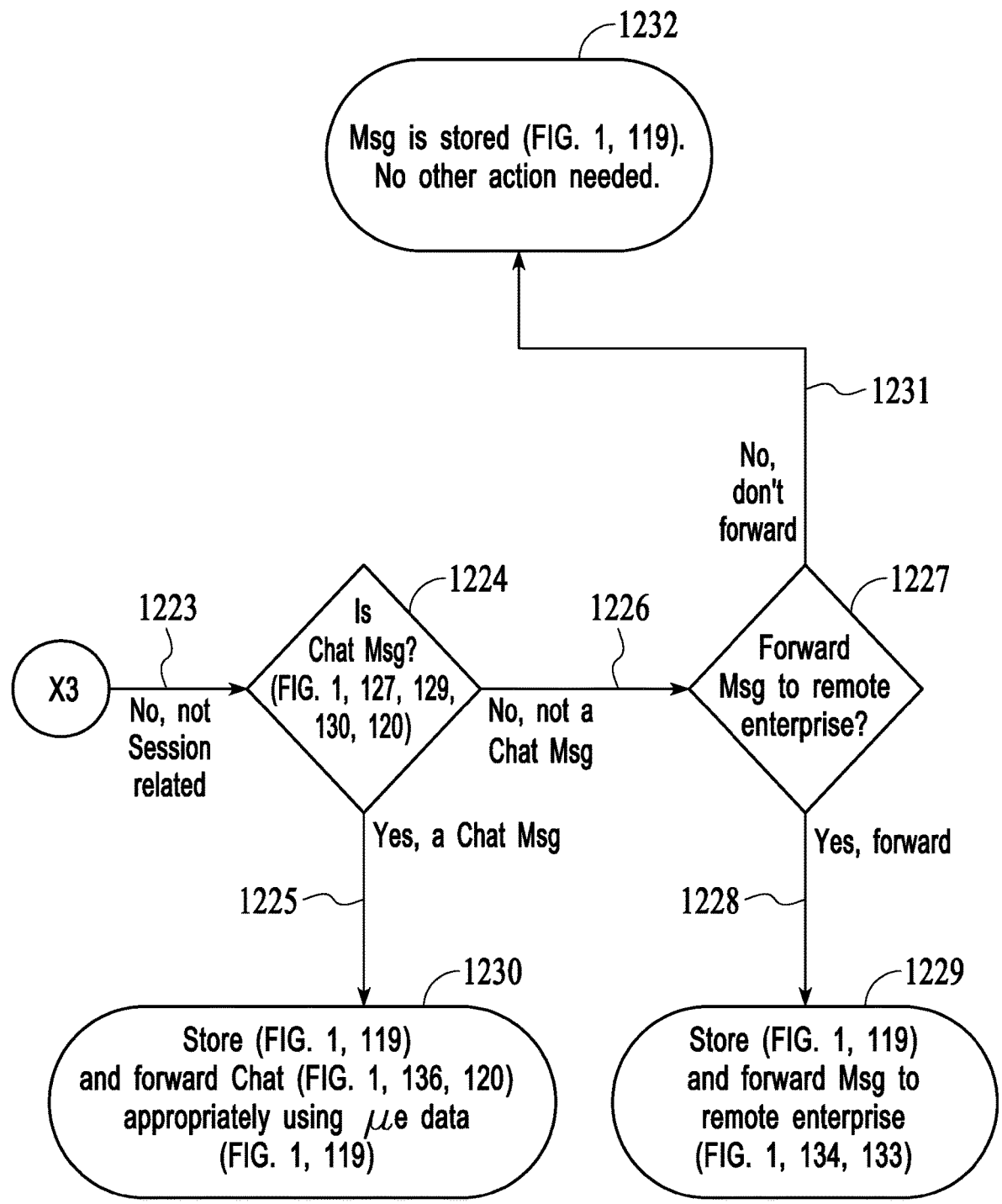

FIG. 12C illustrates the case when an incoming message for an embodiment is neither 1223 for a new goal nor for an existing micro-engagement session but for a new or existing chat session 122$ that operates within the micro-engagement. If so, the chat message is stored 1230 and then forwarded using the micro-engagement data. This can occur when there is an ongoing chat between a business agent FIG. 1, 103 and a customer FIG. 1—106, FIG. 9—901.

In another embodiment, the business agent may not be there and the chat message needs to be stored 1230 and no forwarding required. If in another embodiment, this message is not chat related 1226, and the default behavior would be to forward that message to the remote enterprise 1227, 1228. If, however, for this goal instance based on dynamic conditions in an embodiment, the message cannot be forwarded, 1231 then the message shall be stored and no further action taken 1232.

The invention presented here incorporates several embodiments and it should be evident for those skilled in the same art that various other embodiments are possible and can be practiced. Various components within the micro-engagement platform 100 referred in the main illustration FIG. 1 are used to convey one form of implementing the overall solution that is required to support the invention presented here. Using similar components or a combination of these alternate ways of implementing the solution presented in this invention can be achieved. The web-based servers present 109 either independently or as part of edge gateways 110 can be combined and implemented differently as well. In summary, the components within platform 100 can exist in different forms and combinations.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. Some aspects which are mentioned in this proposal as being created with visual tools such as the Goal Builder can also be coded using scripts. One such example is that the goal itself can be coded using scripts instead of relying on visual tools provided by the goal builder.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "clicking" or "texting" or the like, refer to the action and processes of a computer system, or similar electronic computing device that manipulates and transforms data represented as physical (electronic) quantities within the computer system memories or registers or other such information storage, transmission or display devices.

The apparatus useable to implement the system according to the present invention are known to persons of ordinary skill in the art from the description above. In addition, the present invention is not described with reference to any particular programming language. It is appreciated that a variety of programming languages may be used to implement aspects of the present invention as described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A micro-engagement system hosting a micro-engagement platform in a server for interactive coupling of user-initiated micro-engagements with a customer mobile device, said system comprising:
   a data storage media that stores a plurality of short information snippets inputted by a user;
   a processor in the server, coupled with the data storage media, that executes the following modules:
   a goal builder that provides an interface for enabling the user to input the plurality of short information snippets, each short information snippet associated with a respective micro-engagement designed to be separately transmitted to the customer mobile device, and builds a goal of the user in the form of a plurality of micro-engagements; and
   an executor that receives customer mobile device contact data, and couples the plurality of short information snippets stored in said data store to the customer mobile device as a series of micro-engagements, and receives a response to one or more of said micro-engagements from the customer mobile device; and
   a plurality of edge gateways, coupled with the server with the processor, that detect customer presence, select one of a plurality of communication channels based on a detected mode of the customer presence, and deliver the micro-engagements to the customer mobile device via the communication channel that is selected, thereby enabling interaction by the customer with the respective micro-engagements, wherein the edge gateways deliver the micro-engagements as messages via a default communication channel when no current connection between the customer mobile device and the micro-engagement platform is detected.

2. The micro-engagement system of claim 1, further comprising:
an enterprise data manager, coupled to the processor in the server, for defining enterprise data, making the enterprise data available to the goal builder, acquiring the enterprise data through an application programming interface with one or more remote enterprise systems, allowing access to the executor to utilize the enterprise data to affect micro-engagements.

3. The micro-engagement system of claim 1, further comprising:
a user behavior monitor, coupled to the processor in the server, to track which communication channel is being used by a respective customer mobile device, and to enable the edge gateways to identify which of the plurality of communication channels is to be used for presenting the next micro-engagement to the customer mobile device as a function of said tracking.

4. The micro-engagement system of claim 3, wherein the user behavior monitor detects scripts on the customer mobile device running on behalf of the micro-engagement system; and wherein the edge gateways are enabled to maintain connection with the customer mobile device running the scripts either via a browser on the customer mobile device or within a mobile app running on the customer mobile device.

5. The micro-engagement system of claim 1, further comprising a dynamic data store, and wherein the edge gateways identify different messages received from the customer mobile device and selectively route them to the dynamic data store for later use by the executor and for monitoring of results of the micro-engagements.

6. The micro-engagement system of claim 1, wherein a weighting function is created as a function of the communication channel selected by the customer mobile device for sending a previous response to the micro-engagement system, and wherein the communication channel selected for the next micro-engagement is a function of said weighting function.

7. The micro-engagement system of claim 1, wherein the micro-engagement system is configured to:
enable the user to create each goal; and
enable the user to view the results of the micro-engagements.

8. The micro-engagement system of claim 7, wherein the micro-engagement system is configured to:
enable the user to publish one or more keywords for a given goal; and
enables the customer via the respective customer mobile device to initiate a goal by sending one of said keywords to the micro-engagement system.

9. The micro-engagement system of claim 7, wherein the micro-engagement system enables the user to initiate goals via a graphical user interface, and wherein, through the graphical user interface, the user can monitor all the micro-engagements with customers via the respective customer mobile devices.

10. The micro-engagement system of claim 1, wherein the user is a remote enterprise system and wherein the micro-engagement system enables the remote enterprise system to initiate goals via a programming interface, and wherein, through the programming interface, the remote system can monitor all the micro-engagements with customers via the respective customer mobile devices.

11. The micro-engagement system of claim 10, wherein the programming interface comprises:
an API with the ability for remote systems to identify specific goals to be launched;
an API with the ability for remote systems to identify specific goals to retrieve customer responses; and
an API with the ability for remote systems to identify specific micro-engagements and retrieve analytics from customer engagements.

12. The micro-engagement system of claim 1, wherein the processor of the micro-engagement system enables:
displaying a micro-engagement visually on a mobile browser;
transferring scripts from the system to the mobile browsers; and
retrieving the response from customer mobile device to each micro-engagement through scripts connecting back to the micro-engagement system.

13. The micro-engagement system of claim 12, wherein contents of the micro-engagement includes one or more of text, video, and images.

14. The micro-engagement system of claim 1, wherein the processor of the micro-engagement system further enables:
detecting active presence of the customer and launching the micro-engagements to the customer;
identifying an active delivery path that the customer is most recently responsive on; and
selecting the identified active delivery path to continue the micro-engagement.

15. The micro-engagement system of claim 1, wherein the processor of the micro-engagement system further performs:
enabling multiple goals to be active on a customer mobile device at any time and enabling the customer to selectively access any one of the active goals and engage with them.

16. The micro-engagement system of claim 15, wherein the processor of the micro-engagement system further performs:
identifying active goals for the customer;
delivering and presenting the active goals to the customer mobile device;
allowing the customer via the customer mobile device, to select and engage with any specific ongoing goals; and
allowing the customer to switch between goals.

17. The micro-engagement system of claim 1, wherein the plurality of edge gateways include at least one messaging gateway to deliver the micro-engagements via the default communication channel when no current connection to the micro-engagement platform is detected.

* * * * *